United States Patent
Finkelstein et al.

[11] Patent Number: 6,139,931
[45] Date of Patent: *Oct. 31, 2000

[54] HIGH BARRIER CLOSURE LINER FOR CARBONATED BEVERAGE CONTAINERS AND THE LIKE

[75] Inventors: Harvey Finkelstein, Hewitt, N.J.; Victor Flores, Goldens Bridge, N.Y.; Anatoly Verdel, Fair Lawn, N.J.; Bruce Burns, Washingtonville, N.Y.; Richard McKenna, Oceanport, N.J.

[73] Assignee: Tri-Seal Holdings, Inc., Blauvelt, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/013,918

[22] Filed: Jan. 27, 1998

Related U.S. Application Data

[63] Continuation-in-part of application No. 08/889,917, Jul. 10, 1997.

[51] Int. Cl.[7] ............................ B29D 9/00; B29D 22/00; B32B 7/12; B65D 53/06; C09K 15/00
[52] U.S. Cl. ................. 428/36.6; 428/36.5; 428/36.91; 428/322.7; 215/347; 215/348; 215/228; 252/188.28
[58] Field of Search ................................ 215/228, 261, 215/347, 348; 206/484.1, 484.2; 292/188.28; 428/66.4, 35.7, 36.5, 36.6, 36.91, 319.7, 322.7

[56] References Cited

U.S. PATENT DOCUMENTS

| | | | |
|---|---|---|---|
| 4,048,361 | 9/1977 | Valyi | 428/35 |
| 4,279,350 | 7/1981 | King | 215/228 |
| 4,287,995 | 9/1981 | Moriya | 215/228 |
| 4,391,863 | 7/1983 | Bonis | 428/35 |
| 4,451,512 | 5/1984 | Yazaki et al. | 428/36 |
| 4,528,219 | 7/1985 | Yamada et al. | 428/35 |
| 4,536,409 | 8/1985 | Farrell et al. | 426/398 |
| 4,564,541 | 1/1986 | Taira et al. | 428/35 |
| 4,702,966 | 10/1987 | Farrell et al. | 428/500 |
| 4,756,436 | 7/1988 | Morita et al. | 215/228 |
| 4,807,745 | 2/1989 | Langley et al. | 206/245 |
| 4,840,280 | 6/1989 | Schvester | 215/228 |
| 4,980,211 | 12/1990 | Kushida et al. | 428/36 |
| 5,073,420 | 12/1991 | Yano et al. | 428/35 |
| 5,143,763 | 9/1992 | Yamada et al. | 428/36.2 |
| 5,232,754 | 8/1993 | Waugh | 428/367 |
| 5,238,718 | 8/1993 | Yano et al. | 428/35 |
| 5,346,735 | 9/1994 | Logan et al. | 428/36.7 |
| 5,350,622 | 9/1994 | Speer et al. | 428/215 |
| 5,413,827 | 5/1995 | Brodie, III et al. | 428/35.7 |
| 5,472,753 | 12/1995 | Farha | 428/35 |
| 5,492,742 | 2/1996 | Zenner et al. | 428/35.2 |
| 5,529,833 | 6/1996 | Speer et al. | 428/215 |
| 5,591,390 | 1/1997 | Walton et al. | 264/456 |
| 5,598,940 | 2/1997 | Finkelstein et al. | 215/348 |
| 5,601,200 | 2/1997 | Finkelstein et al. | 215/348 |
| 5,615,789 | 4/1997 | Finkelstein et al. | 215/348 |
| 5,700,554 | 12/1997 | Speer et al. | 428/220 |
| 5,744,056 | 4/1998 | Venkateshwaren et al. | 252/188.28 |
| 5,885,481 | 3/1999 | Venkateshwaran et al. | 252/188.28 |

*Primary Examiner*—Joseph D. Anthony
*Attorney, Agent, or Firm*—Stroock & Stroock & Lavan LLP

[57] ABSTRACT

A multi-layer closure liner for carbonated beverage containers and the like, including a gas barrier layer, a first tie layer on an upper surface of the gas barrier layer, a second tie layer on a lower surface of the gas barrier layer, a first polyolefinic resin layer on the upper surface of the first tie layer, and a second polyolefinic layer on the lower surface of the second tie layer. In the preferred embodiment, the gas barrier layer is ethylene vinyl alcohol copolymer (EVOH), the first and second tie layers are functionalized polyolefin and the first and second polyolefinic resin layers are ethylene vinyl acetate (EVA). The layers defining the closure liner are preferably simultaneously formed using a co-extrusion process to prevent the gas barrier layer from being exposed to moisture.

10 Claims, 3 Drawing Sheets

HIGH BARRIER CLOSURE LINER FOR CARBONATED BEVERAGE CONTAINERS AND THE LIKE

CROSS-REFERENCE TO RELATED APPLICATIONS

This application is a continuation-in-part of application Ser. No. 08/889,917 filed Jul. 10, 1997.

BACKGROUND OF THE INVENTION

1. Field of the Invention

The present invention relates to an improved closure liner and, more specifically, to a multi-layer closure liner having an improved gas barrier characteristic and particularly suited for use with container closures for carbonated beverages or the like.

2. Brief description of the Related Art

Plastic containers have become widely used and commercially successful for holding and storing a wide variety of products. For example, plastic containers are now widely used to contain carbonated beverages. In fact, most bottles containing carbonated beverages are produced from polyethylene terephthalate (PET) or a similar material, which provides a low cost, light weight and durable container. Such containers are typically provided with a polyolefinic resin cap or closure and an ethylene vinyl acetate (EVA) liner.

One problem with the use of such containers for carbonated beverages is that this type of closure and liner have a relatively high gas transmission rate. Carbonated beverages rely on the maintenance of a certain amount of carbon dioxide gas pressure in the container to maintain the carbonated quality of the beverage. The problem, however, is that this type of container for carbonated beverages has a limited shelf life due to the gas transmission rate of the PET bottle, the polyolefinic closure and the EVA liner. In other words, such containers, closures and liners permit loss of carbonation because the resins used provide only a limited barrier to escaping carbon dioxide gas. Another and somewhat lesser problem, is that the container, closure and liner allow oxygen to enter the container which can degrade the taste of carbonated beverages over time and/or adversely affect other characteristics of a product contained therein.

The prior art has attempted to reduce the gas transmission rate of the container itself by providing a layer of resin therein having little or no permeability to gases, as evidenced, by U.S. Pat. Nos. 5,472,573; 4,391,863; 5,238,718; 4,980,211; 4,564,541; 4,451,512 and 4,528,219. While these prior art techniques have been helpful in reducing gas loss though the container itself, a significant amount of gas is still lost through the closure, including the closure liner.

Thus, a need exists for an improved closure liner having suitable compressibility and other physico-mechanical properties of existing EVA liners, but which prevents or significantly reduces gas transmission through the closure of the container, thereby extending the shelf life of carbonated beverages and the like.

SUMMARY OF THE INVENTION

A primary object of the present invention is to provide a multi-layer closure liner particularly suited for use in connection with container closures for carbonated beverages.

A further object of the present invention is to provide a multi-layer closure liner having a relatively low gas transmission rate as compared to prior art closure liners.

A more particular object of the present invention is to provide a multi-layer closure liner which reduces loss of carbonation and increases shelf-life for carbonated beverages and the like.

Another object of the present invention is to provide a closure liner which is inexpensive to manufacture and reliable in operation.

Still another object of the instant invention is to provide a closure liner which can easily be adapted for use with a variety of different closures for carbonated beverages containers and the like.

A further object of the present invention is to provide a closure liner which can be manufactured using existing manufacturing hardware.

Yet another object of the present invention is to provide a high barrier closure liner having a multi-layer polymer structure which can be manufactured using simultaneous extrusion of polymers through common co-extrusion hardware.

These and other objects are achieved by the instant invention, which provides a multi-layer closure liner including a gas barrier layer, a first tie layer on an upper surface of the gas barrier layer, a second tie layer on a lower surface of the gas barrier layer, a first polyolefinic resin layer on an upper surface of the first tie layer, and a second polyolefinic resin layer on a lower surface of the second tie layer.

In accordance with a more particular aspect of the instant invention, the polyolefinic resin layers may be made from recycled or low grade material to reduce the cost of the liner, and the liner further includes higher quality outer skin layers on the first and second polyolefinic layers. The low grade material may, for example, be material which is not FDA approved for food-contact applications. Such non-food contact grades of polyolefinic resins are typically more economical.

In accordance with a preferred embodiment of the invention, the gas barrier layer is ethylene vinyl alcohol copolymer (EVOH), the first and second tie layers are a functionalized polyolefin available, for example, from Millennium Petrochemicals and sold under the trade name Plexar, and the first and second polyolefinic resin layers are ethylene vinyl acetate (EVA).

In accordance with yet another aspect of the invention, the individual layers defining the closure liner are simultaneously formed using a co-extrusion process, so that the gas barrier layer is not exposed to moisture.

BRIEF DESCRIPTION OF THE DRAWINGS

Other features, objects and advantages of the subject invention will become apparent from a study of the following specification when viewed in light of the accompanying drawings, in which.

DETAILED DESCRIPTION OF THE PREFERRED EMBODIMENTS

Figure 1:
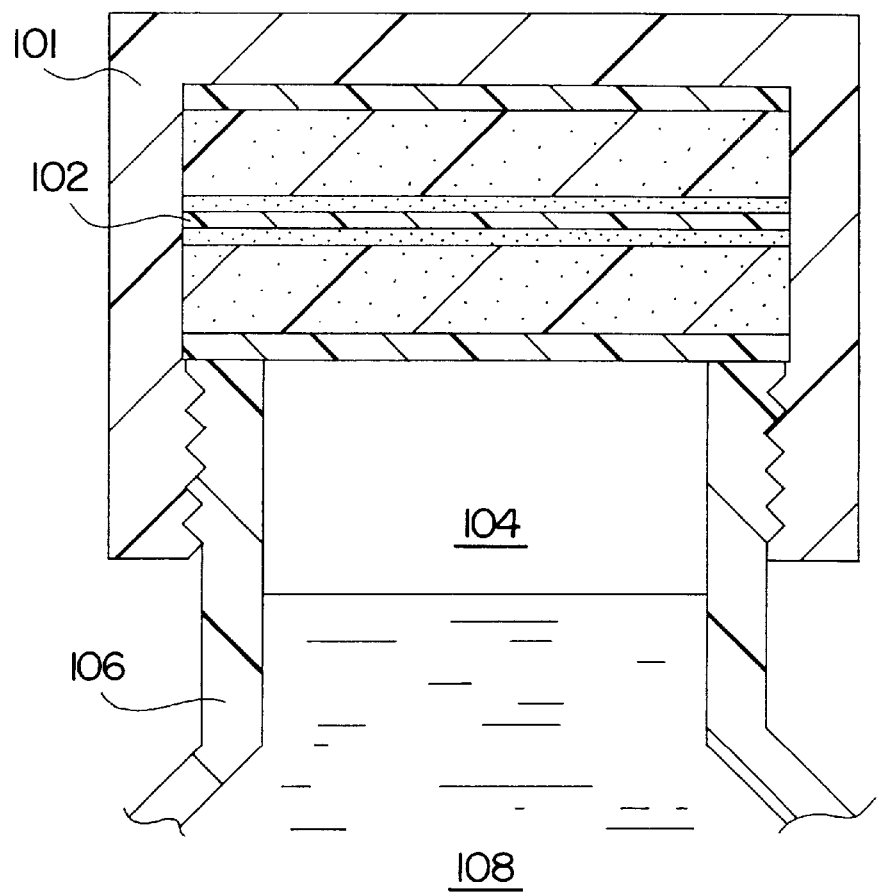
FIG. 1 a schematic cross-sectional view showing one embodiment of the multi-layer liner according to the present invention, wherein the liner is disposed in a closure which is threaded into a sealing position on the neck of a bottle or the like type of container.

Referring now to the drawings, wherein like reference numerals designate similar parts throughout the various views, FIG. 1 schematically shows a screw top closure 101 provided with a liner 102 constructed in accordance with one embodiment of the present invention. The closure 101 is designed to screw onto a container 106, such as a bottle or the like type of container. While a screw top closure 101 is illustrated, the instant closure liner 102 may also be used with any other type of suitable closure, such as a snap-on closure. While the liner 102 can be used to provide an improved gas barrier for any suitable type of container closure 101, it has particular utility in reducing carbonation loss from carbonated beverages 108 through the closure 101. It is noted that a head space 104 is typically defined in such a container 106 between the closure liner 102 and the fill or contents 108 of the container 106. As will be explained in detail hereinafter, the instant closure liner 102 provides a high gas barrier which reduces gas loss from the container 106 through the closure 101, while also reducing external gas, such as oxygen contained in the ambient atmosphere, from entering the container 106 through the closure 101. It will, of course, be appreciated that FIG. 1 is not drawn to scale and the thickness of the liner 102 is exaggerated for illustration purposes.

Figure 2:
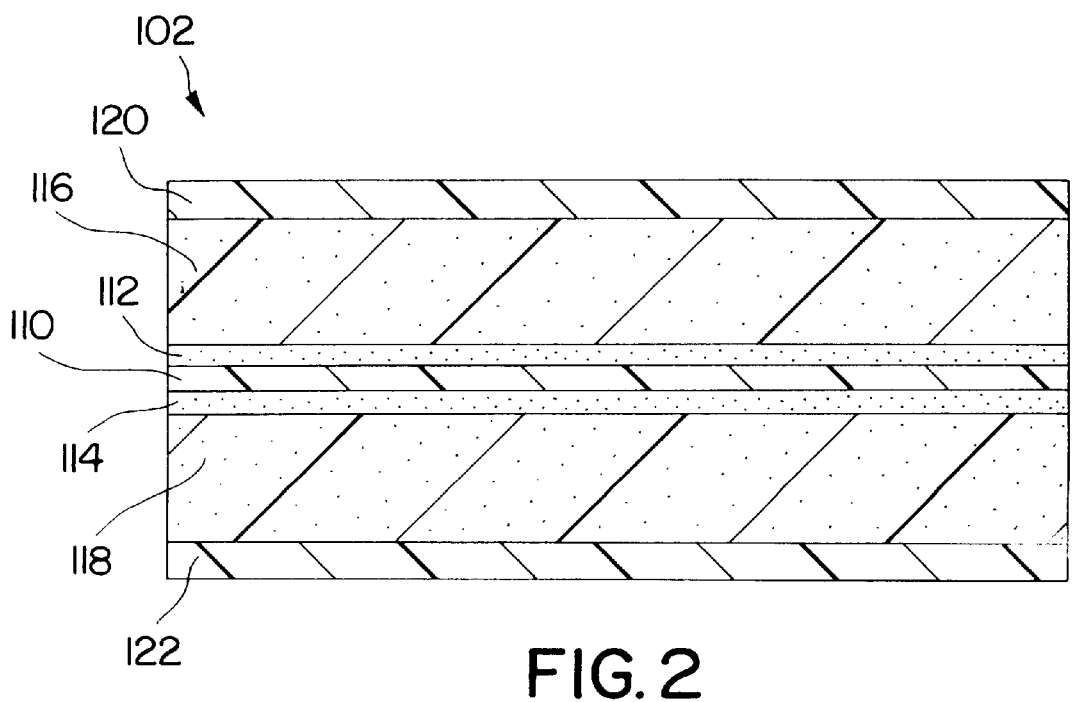
FIG. 2 is a schematic cross-sectional view of the liner of the instant invention according to the embodiment of FIG. 1.

The structure and particular layers in the embodiment of the instant liner shown in FIG. 1, will now be described with reference to FIG. 2, wherein an enlarged view of this embodiment of the liner 102 is shown. As shown in FIG. 2, the instant liner 102 includes a gas barrier layer 110 which reduces or prevents gas transmission into and out of the container 106 through the closure 101.

Polymers which can be used to form the gas barrier layer in accordance with the present invention can be classified as "glassy" polymers. These glassy polymers typically have a high level of crystallization. Generally, orientation and crystallization of the polymers improves the barrier properties of the material as a result of the increased packing efficiency of the polymer chains. The particular barrier properties of polymeric materials are determined by the chemical structure of the chain and the system morphology. Examples of commercially available polymers which can be used as the barrier layer are:

Polyethylene terephthalate (PET); Polyvinylidene chloride (PVDC); Polyethylene Naphthalate (PEN); Ethylene vinyl alcohol copolymer (EVOH); and admixtures thereof.

PET is widely used presently for the production of containers where gas transmission properties are important. It is used for manufacturing containers designed for the packaging of carbonated beverages. Typically, 0.001" thick film prepared from PET has an oxygen transmission rate of about 5 cc/100 sq.in/day atm. A 0.001" thick PET resin film has a $CO_2$ transmission rate of about 20 cc/100 inch sq./day at 0% relative humidity.

PVDC is sold under the trade name of Saran and is used for high-barrier films in co-extruded structures. The oxygen permeability of this polymer at a thickness of 0.001" is approximately 1.2 cc/100 sq.in/day atm.

PEN is similar in chemistry to PET but offers four to five times better gas transmission barrier characteristics than PET. A 0.001" thick PEN resin film has a $CO_2$ transmission rate of about 4.5 cc/100 inch sq./day at 0% relative humidity.

EVOH is presently used for the manufacture of multilayer bottles, co-extruded films and laminated flexible packaging items. Oxygen permeation of a 0.001" thick film of EVOH will vary from 0.01 to 1.2 cc/100 sq.in./day atm depending on the particular grade of resin being used and the ambient conditions. A 0.001" thick EVOH resin has a $CO_2$ transmission rate of about 0.01 to 0.2 cc/100 inch sq./day at 0% relative humidity, depending on the particular grade of the resin used.

Each of the above mentioned polymers is available in different grades with different viscosity and some differences in properties. Nevertheless, any of the above mentioned polymers, as well as any other suitable gas barrier material can serve as the gas barrier layer 110 of the instant invention. It is noted that a low density polyethylene film, at the thickness level of 0.001", has an oxygen transmission rate of about 420 cc/100 sq. in/day atm while polypropylene will typically exhibit a value of about 150 cc/100 sq. in/day atm. The selection of the particular polymer used as the barrier polymer can vary depending on the specific characteristics of the product packaged, as one skilled in the art will readily understand from the description of the invention herein.

The liner 102 further includes, if necessary, an adhesive or tie layer 112 and 114 on the upper and lower surfaces of the gas barrier layer 110, respectively. As will be explained in more detail below, the next layers (layers 116, 118, 120 and/or 122) may be olefinic in chemistry. However, the polymers which can be used as the gas barrier layer 110 are non-olefinic material and usually polar in nature. High adhesion levels can be obtained between two polyolefinic materials (polyethylene and ethylene vinyl acetate, for example) when they are extruded simultaneously through the common co-extrusion hardware as individual layers. However, in the case of polar polymers and non-polar polymers (such as a polyolefin) the same adhesion level cannot be obtained due to non-similarities in the chemical structure therebetween. Although products of co-extrusion of the barrier polymer (EVOH, for example) and polyolefin (Polyethylene) can be obtained, such products have low commercial value, due to the fact that the layers will tend to separate during fabricating operations, such as winding, die-cutting and forming.

Therefore, the tie layers 112 and 114 may be used in order to increase the bond level between the gas barrier layer and the next layers of the liner 102. In accordance with the instant invention, polymers used for the tie layers are typically functionalized polyolefins with the ability to create a high level permanent bond with polyolefinic resins as well as with polar resins. Examples of such adhesive products are the line of functionalized polyolefins sold under the trade name Plexar by Millennium Petrochemicals (formerly Quantum Chemicals). It is noted that the particular chemistry of the adhesives sold under the trade name Plexar is not known to the instant inventors, and, therefore, the trade name (Plexar) is used herein to identify an example of the tie layers 112 and 114. However, the term Plexar as used herein is meant to cover products produced or sold under any trade name having the same, similar or equivalent chemistry to that of the Plexar product line available from Millennium Petrochemicals. The same is true for all of the other products referenced herein by trade name. These functionalized polyolefinic products are designed to be used in a co-extrusion process which involves EVOH as one of the layers and polyolefinic resins as other layers. Depending on the chemistry of the particular grade of an EVOH resin, Plexar resin grade can be used to obtain a necessary level of bond strength between the EVOH layer and the polyolefinic layer. Other products which can be used as an adhesive are sold under the trade names Bynel by E.I. du Pont de Nemours Co. and Admer by Mitsui Petrochemical Industries, Ltd. Depending on the particular polymer used in the structure as the gas barrier layer 110, adhesive resins which can be used as the tie layer to achieve the desired bond levels also include: ethylene vinyl acetate and ethylene acrylic acid copolymers sold under trade names Primacor by Dow Chemical or Nucrel by Du Pont.

The liner 102 further includes polyolefinic resin layers 116 and 118 on the upper and lower surfaces of the tie layers 112 and 114, respectively, or directly on the gas barrier layer if no tie layer is needed. The polyolefinic layers 116 and 118 are preferably solid layers, but may be foamed layers, if desired, to provide increased resiliency for the liner and help achieve a desired seal between the closure 101 and the container 106.

The polymers, and admixtures thereof, which can be used for the layers 116 and 118 are identified as polyolefinic resins. A more specific description of suitable polymers, such as ethylene vinyl acetate, polypropylene, polyethylene, thermoplastic elastomers, and their admixtures, which can be used as layers 116 and 118, are described in U.S. Pat. Nos. 5,601,200; 5,615,789 and 5,598,940, all of which are hereby incorporated by reference.

In accordance with the instant invention, the layers 116 and 118 may be made from recycled material or a low grade polyolefinic resin, such as non-food contact grades, in order to reduce the cost of the liner. For example, these layers may comprise recycled liner material obtained from waste material generated during a liner punching operation, wherein individual liners are punched or cut from a sheet of liner material. This type of waste material is sometimes referred to as a "skeleton". As another example, the material comprising layers 116 and 118 could simply be a low grade or low cost polyolefinic resin.

If foamed layers are desired, the foaming may be obtained by creating a cellular structure in the polymer. This is achieved by blending a suitable chemical blowing agent into the formulation. One example of such a blowing agent presently used in the plastics processing industry is azodicarbonamide. This material is presently produced and sold by several different companies under the trade names Celogen, Ficel, Genitron, Azocel and others. There are, of course, other known chemicals which can be used to create a cellular or foamed structure in a plastic article, and any suitable means for generating voids within the layers may be used. Other examples of suitable blowing agents include, polycarbonic acids in combination with bicarbonate salts (sodium bicarbonate) and 4,4'-oxybis (benzenesulfohydrazide), trihydrazinotriazine.

These chemical blowing agents are materials which, upon exposure to an elevated temperature in the barrel of an extruder, will decompose and evolve gaseous compounds. These gases, when blended with plastic and extruded through the die, create multiple voids distributed consistently throughout the polymer. As the blend of dissolved gas and molten plastic exits the die, the pressure difference between the pressure inside the extruder barrel and the environment will result in the expansion of each individual cell, thereby creating a polymer foam, or a product which includes multiple voids.

The ratio of the volume of voids to the volume of plastic in the foamed structure determine the product's density, at least as far as specific weight per unit of volume is concerned. This ratio also determines the physical properties of the foamed polymer, i.e., its elasticity, compressibility, compression set etc. The physical properties of the foam produced also depend on the particular polymer or the admixture of polymers which were blended with the chemical blowing agent prior to extrusion.

Foamed layers can also be obtained by direct injection of compressed gas into an extrusion barrel. Such a method does not require a chemical blowing agent, but it does require equipment modifications which will allow gases to be metered into the extruder barrel at elevated pressure levels.

The liner 102 further includes outer or skin layers 120 and 122 on the upper and lower surfaces of the polyolefinic resin layers 116 and 118, respectively. The skin layers are designed to protect internal layers of the liner. The skin layers 120 and 122 also provide the necessary surface friction to assure that proper application and removal torques occur during the packaging process and at the time a consumer opens the container. It is noted that the application torque is related to the torque applied to the closure by automatic capping equipment. In most practical applications it is preferred that this torque be high enough to prevent the closure or cap from unthreading itself and resulting in the closure becoming loose, thereby adversely affecting the seal during shipping and/or storage of the container. The removal torque is that which needs to be applied to the closure 101 in order to unthread the closure from the neck of the container 106. This removal torque should be low enough to allow a consumer to open the container using manual manipulation without using any tools or levers.

The liner 102 may be maintained in position in the closure 101 by a friction fit, or it may be glued inside the closure 101. When the liner is glued in the closure 101, the skin layer 120 in direct contact with the closure member, may be subjected to a hot-melt adhesive application to improve the retention of the liner inside the closure during transport and package assembly. Further, when such skin layers are extruded, the liner exhibits improved flatness due to the symmetry which is possible using extrusion. The outer layers 120 and 122 may be formulated with a re-seal feature which enables closure or sealing of any punctures occurring as a result of a sharp instrument, such as a hypodermic needle, for example, being driven therethrough in order to withdraw all or part of the content of the container.

Figure 3:
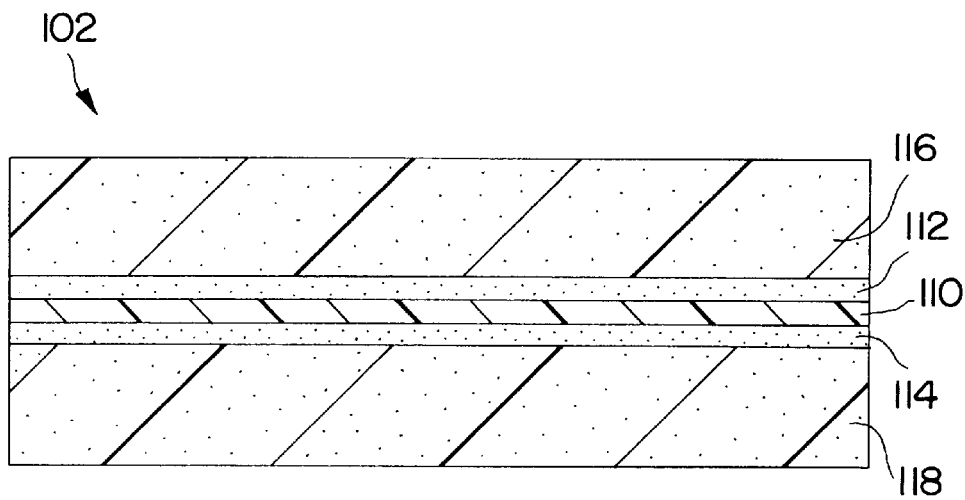
FIG. 3 is a schematic cross-sectional view of a second embodiment of the liner according to the instant invention.
Figure 4:
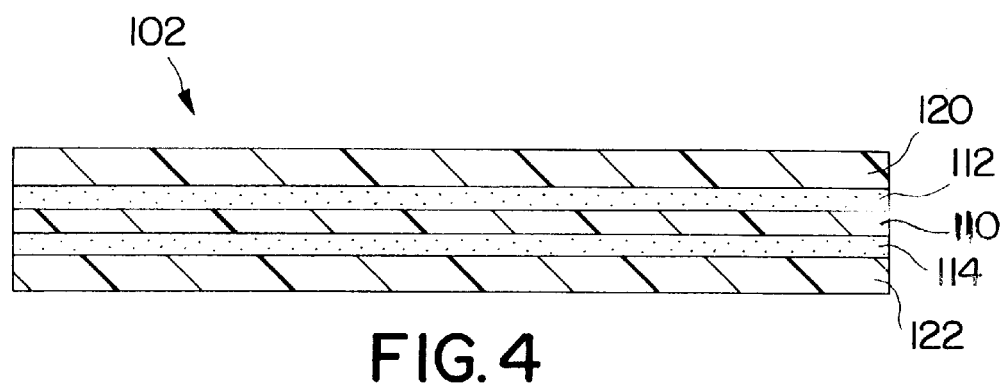
FIG. 4 is a schematic cross-sectional view of a third embodiment of the liner according to the instant invention.
Figure 5:
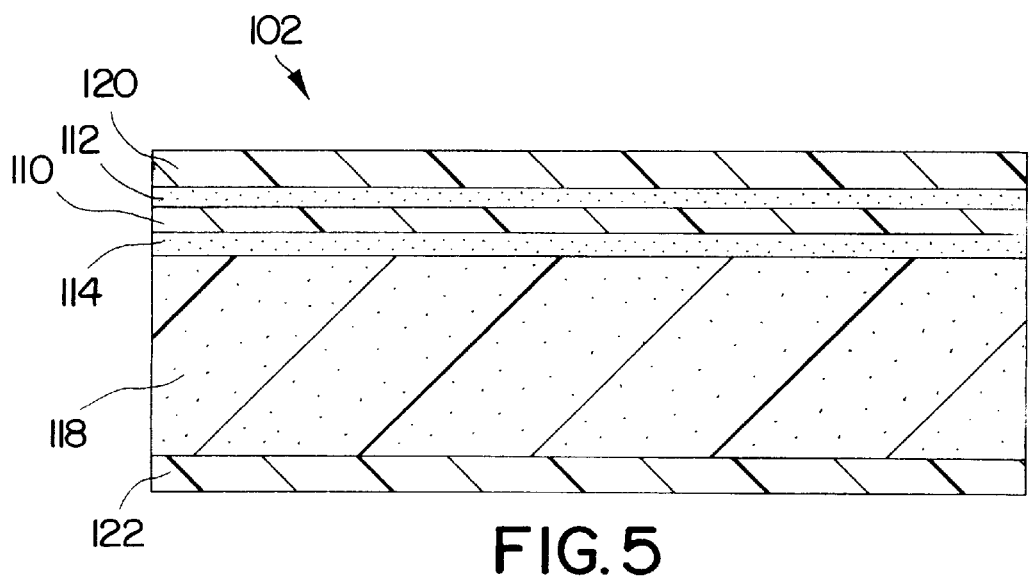
FIG. 5 is a schematic cross-sectional view of a fourth embodiment of the liner according to the instant invention.

The outer layers 120 and 122 are preferably produced using polyolefinic resins, such as low or high density polyethylene, polypropylene, ethylene vinyl acetate copolymers, thermoplastic elastomers, or admixtures thereof. The outer layers are preferably solid layers made from high quality polyolefinic resin, thereby preventing moisture from entering the liner and adversely affecting the gas barrier layer 110. If layers 116 and 118 are made from low grade or recycled material, they typically may not provide a high moisture barrier. Thus, the high quality outer layers 120 and 122 can be used to provide a higher level of moisture protection then would otherwise be available from the recycled or low quality resin layers. It is noted, however, that if layers 116 and 118 provide sufficient moisture protection for the gas barrier layer 110 for a particular application, then the outer layers 120 and/or 122 could be eliminated, as shown in FIG. 3. Alternatively, as shown in FIGS. 4 and 5, layers 116 and/or 118 may be eliminated, if desired for certain applications.

The outer layers 120 and 122 and/or layers 116 and 118, may be produced using thermoplastic elastomers, which can be described generally as particles of a cross-linked rubber suspended in a thermoplastic resin. These type of materials are sold under the trade names of Santoprene by Advanced Elastomer Systems and Sarlink by DSM. Such thermoplastic elastomers typically have better elasticity and elastic recovery properties when compared to polyolefinic resins, and are especially advantageous to use when the resealing feature is desired, and for certain applications requiring the liner to conform/adapt to imperfections in the neck/mouth of the container 106. The term polyolefinic resins as used herein is meant to include thermoplastic elastomers.

It is noted that the two outer layers 120 and 122 may be made of different material. While production of the liner 102 is simplified when the same material is used, the present invention is not limited thereto. For example, outer layer 122 which is exposed to the head space 104 in the container may be made of a material which is different from outer layer 120 which is in contact with the underside of the closure member. In other words, the physical properties of the two layers 120 and 122, as well as the layers 116 and 118, can be tailored to optimally meet the different media to which they are respectively exposed. The thicknesses of any of the layers may also vary and need not be the same on each side of the gas barrier layer. In other words, the gas barrier layer need not be centrally positioned within the liner. For example, the thickness of the layers may be selected to help protect the gas barrier layer from moisture or other elements originating from inside or outside of the container.

Thus, in the embodiment of FIGS. 1 and 2, the liner 102 includes seven layers (110, 112, 114, 116, 118, 120 and 122) which cooperate to provide a high gas barrier closure liner particularly adapted to reduce the ingress and egress of gases through the closure 101, and thereby extend the shelf-life of products such as carbonated beverages.

In accordance with an important aspect of the instant invention, the inventors have determined a particular combination of materials for the layers defining the liner 102, which combination is particularly advantageous for use in liners for carbonated beverage container closures and the like. More particularly, in accordance with the preferred embodiment of the instant invention, the barrier layer 110 is ethylene vinyl alcohol copolymer (EVOH), the tie layers 112 and 114 are Plexar, and preferably the specific material sold under the trade name Plexar PX 107, and the polyolefinic resin layers 116 and 118 are ethylene vinyl acetate (EVA). The term ethylene vinyl acetate or EVA as used herein refers to a polyolefinic resin comprising a copolymer of ethylene and vinyl acetate (EVA). In accordance with a preferred embodiment of the EVA layer, the polyolefinic resin includes approximately 9% Vinyl Acetate content, but higher or lower Vinyl Acetate content in an EVA copolymer may be used. It is noted that the copolymer is produced from two monomers (ethylene and vinyl acetate), and the amount of vinyl acetate in a copolymer will govern the properties of the finished product, such as hardness, resiliency, etc.

Examples of alternative embodiments of the instant liner 102 are shown in FIGS. 3–5. More particularly, FIG. 3 shows an embodiment wherein no skin layers 120 or 122 are provided, thereby defining a liner with only five layers. As explained above, the polyolefinic layers 116 and 118 may be solid or foamed as desired for the particular application in which the liner is used. The embodiment of FIG. 4, for example, uses solid, high quality polyolefinic resin for layers 120 and 122, and eliminates layers 116 and 118, thereby also reducing the total number of layers to five. The embodiment of FIG. 5 is a hybrid of the embodiment of FIGS. 2 and 4, and includes six layers. More particularly, layers 118 and 122 are provided below the gas barrier layer 110, but only the solid layer 120 is provided above the gas barrier layer 110.

It is noted that in the preferred embodiment for all of the alternative structural embodiments shown in FIGS. 2–5, the barrier layer 110 is ethylene vinyl alcohol copolymer (EVOH), the tie layers 112 and 114 are Plexar, and preferably the specific material sold under the trade name Plexar PX 107, and the polyolefinic resin layers 116, 118, 120 and 122, are ethylene vinyl acetate (EVA).

As explained in detail in parent application Ser. No. 08/889,917 filed Jul. 10, 1997, the liner may also be provided with an oxygen scavenging feature if desired for a particular application. The oxygen scavenging agent may be incorporated in the polyolefinic layers 118 and/or 122. For example, the oxygen scavenging agent may be incorporated into a foamed layer, if a foamed layer is used in the liner, or the agent may be blended into one of the solid polyolefinic layers.

A suitable lubricant, such as the lubricant sold under the trade name Slip-Eze, may be blended into the bottom layer (118 or 122), if desired, to make it easier to remove the closure 101 from the container 106. Other suitable lubricants, such as the product sold under the trade name Crodamide by Croda Corp., as well as other Oleamide or Erucamide type lubricating agents, may also be used.

Figure 6:
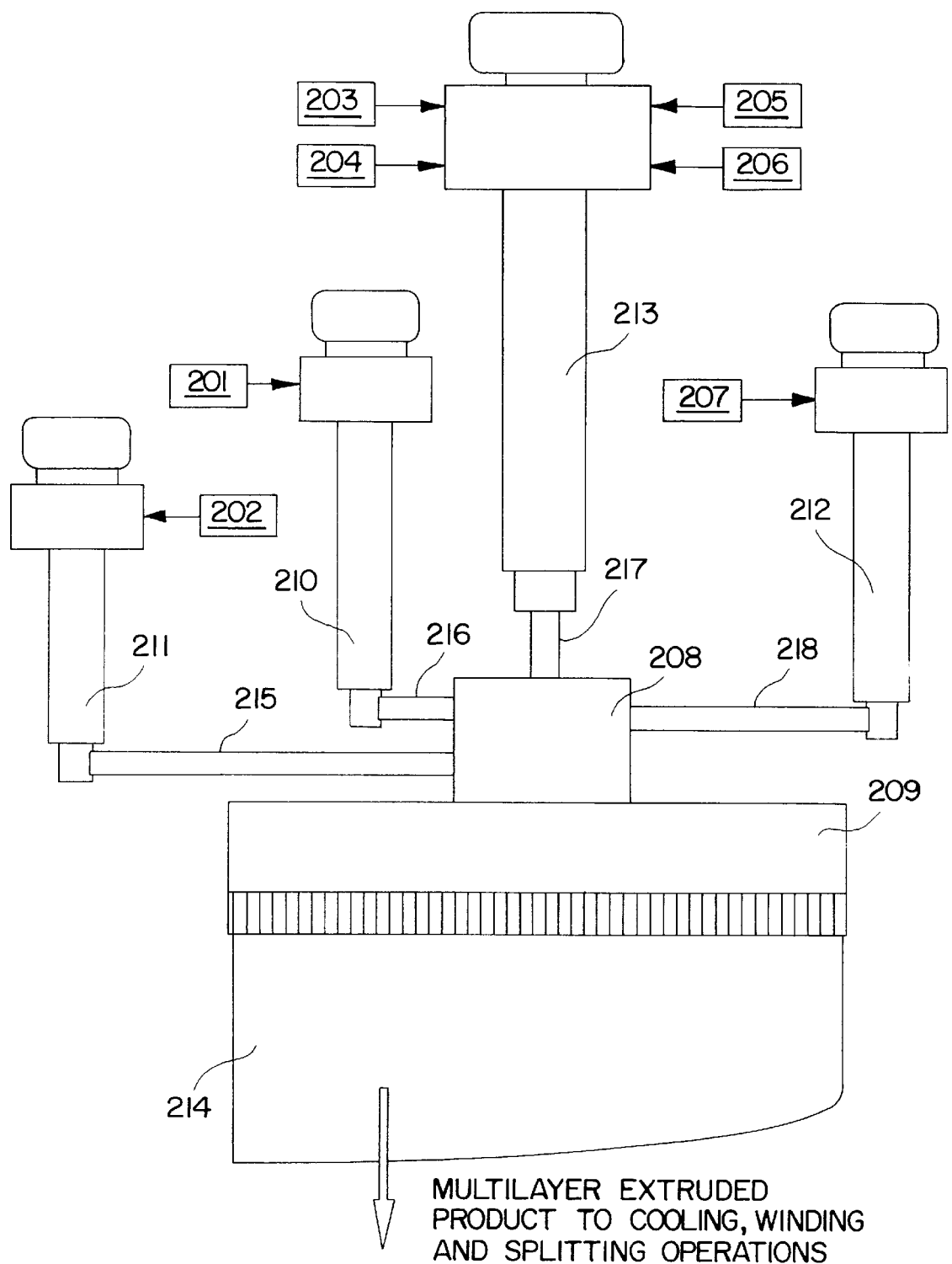
FIG. 6 is a diagram schematically showing an example of a co-extrusion arrangement by which the liner of the instant invention can be manufactured in accordance with the present invention.

FIG. 6 diagrammatically depicts a preferred process for manufacturing the liner 102 of the present invention. Each of the individual resins or agents for each layer are supplied from a plurality of sources 201 to 207, to the individual extruders 210 to 213. The flow of molten polymer from each individual extruder is pumped via connection lines 215, 216, 217 and 218 to the co-extrusion feedblock 208. In the feedblock 208, the flows of the individual materials are arranged into the multi-layer structure of the present invention. Once formed, the multi-layer structure enters an extrusion die 209 wherein it is squeezed and spread to form a multi-layer plastic product 214 in sheet form. The sheet product 214 is then cooled and wound into rolls. The sheet product is then slit into desired widths prior to winding or as a separate operation. A punching operation is then performed to make the individual liners, which are then ready to be installed in closures.

Alternatively, the feedblock 208 can be eliminated if the extrusion die is arranged to handle multi-layer flow (multimanifold die), or a combination of the feedblock and a multimanifold die can be used to produce the co-extruded structure of the present invention.

In accordance with an important aspect of the instant invention, the layers of the liner, or at least the gas barrier layer 110 and tie layers 112 and 114, are preferably coextruded so that the gas barrier layer is not exposed to moisture. If the gas barrier layer is exposed to moisture, the gas barrier property thereof may be degraded.

As is apparent from the foregoing description of the invention, the instant closure liner 102 provides a high gas barrier liner which reduces gas loss from the container 106 through the closure 101, while also reducing external gas, such as oxygen contained in the ambient atmosphere, from entering the container 106 through the closure 101. It is noted that the instant liner 102 may be used with any suitable type of container, including glass and metal containers, as well as the plastic containers described above.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such changes and modifications which come within the full scope and true spirit of the invention.

What is claimed is:

1. A method for forming a liner for use with a container closure, the method comprising the steps of:
   providing a polymer gas barrier material in resin form;
   providing at least two polyolefinic materials in resin form;
   providing tie material in resin form;
   coextruding simultaneously said polymer gas barrier material, said at least two polyolefinic materials, and said tie material to form a multi-layered sheet wherein the gas barrier layer is between two tie layers and said two tie layers are between two polyolefinic material layers;
   cutting said multi-layered sheet to a predetermined size to form the liner for use with the container closure.

2. A method as defined in claim 1, wherein said polymer gas barrier material is selected from the group consisting of polyethylene terephthalate (PET), polyvinylidene chloride (PVDC), polyethylene naphthalate (PEN), and ethylene vinyl alcohol copolymer (EVOH).

3. A method as defined in claim 1, wherein said tie material comprises a functionalized polyolefinic material.

4. A method as defined in claim 1, wherein said polymer gas barrier material has an oxygen transmission rate of less than or equal to 5.0 cc/100 sq. in./day atm. at a thickness of 0.001".

5. A method as defined in claim 1, wherein said polymer gas barrier material is ethylene vinyl alcohol copolymer (EVOH), said tie material is functionalized polyolefinic material, and at least one of said polyolefinic materials is ethylene vinyl acetate (EVA).

6. A method as defined in claim 5, wherein said ethylene vinyl acetate (EVA) is foamed.

7. A method as defined in claim 1, wherein at least one of said polyolefinic materials is selected from the group consisting of: polyethylene, polypropylene, ethylene vinyl acetate (EVA) and admixtures thereof.

8. A method as defined in claim 7, wherein said tie material comprises a functionalized polyolefinic material.

9. A method as defined in claim 7, wherein said polymer gas barrier material is selected from the group consisting of polyethylene terephthalate (PET), polyvinylidene chloride (PVDC), polyethylene naphthalate (PEN), and ethylene vinyl alcohol copolymer (EVOH).

10. A method as defined in claim 9, wherein said tie material comprises a functionalized polyolefinic material.

* * * * *